United States Patent [19]
Brink et al.

[11] Patent Number: 5,279,268
[45] Date of Patent: Jan. 18, 1994

[54] PISTON ASSEMBLY WITH DISTRIBUTED LOADING AND CENTRALLY FASTENED WRIST PIN

[75] Inventors: Randolph C. Brink, Peoria; Donald J. Waldman, Brimfield, both of Ill.

[73] Assignee: Caterpillar INc., Peoria, Ill.

[21] Appl. No.: 69,331

[22] Filed: Jun. 1, 1993

[51] Int. Cl.$^5$ .......................... F02B 75/32; F02F 3/26
[52] U.S. Cl. ............................... 123/197.2; 123/193.6; 92/190; 92/220; 92/238
[58] Field of Search .......................... 123/193.6, 197.2; 92/187, 189, 190, 191, 220, 221, 238, 239

[56] References Cited

U.S. PATENT DOCUMENTS

| | | |
|---|---|---|
| 1,548,329 | 8/1925 | Nelson . |
| 1,810,423 | 6/1931 | Hatch . |
| 4,083,292 | 4/1978 | Goloff ................................... 92/176 |
| 4,617,887 | 10/1986 | Nogase et al. .................... 123/193.6 |

FOREIGN PATENT DOCUMENTS 276458  9/1927  United Kingdom .
2198210A 11/1987  United Kingdom .

Primary Examiner—Noah P. Kamen
Attorney, Agent, or Firm—Diana L. Charlton

[57] ABSTRACT

The design and construction of past piston assemblies having a wrist pin bolted to a connecting rod had excessive structural components requiring more complex machining procedures and tooling. Additionally, the loading and bolting patterns allowed the wrist pin to flex about the central axis of the piston assembly causing ultimate failure of the design. The present invention overcomes these problems by providing a piston assembly utilizing a bifurcated connecting rod and a piston having a pair of outer legs and a central leg. The outer legs and the central leg contact a wrist pin in three locations substantially distributing the forces across the wrist pin uniformly. A connecting means centrally connects the piston assembly shortening the overall length of the piston assembly. This results in a simplified forging or casting process, a more easily machinable piston, and a higher reliability design with improved load capacity.

11 Claims, 4 Drawing Sheets

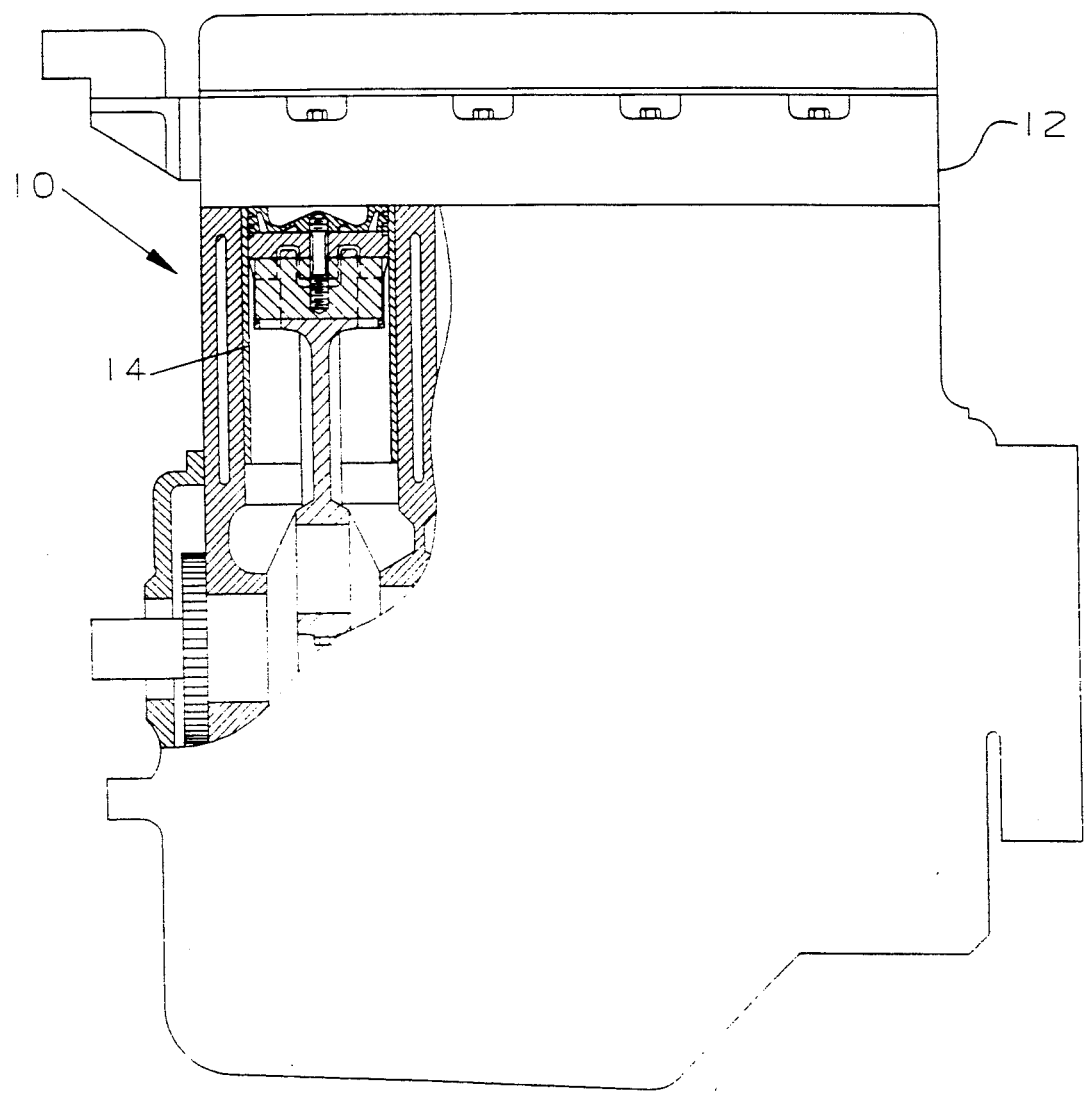
Fig_1_

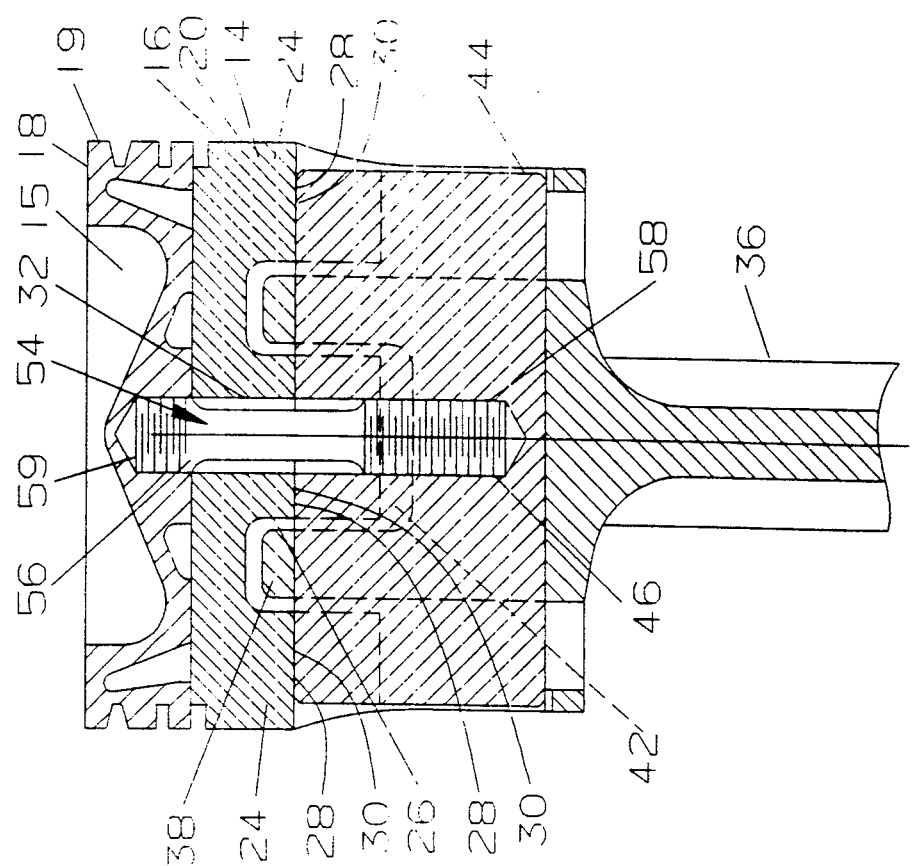
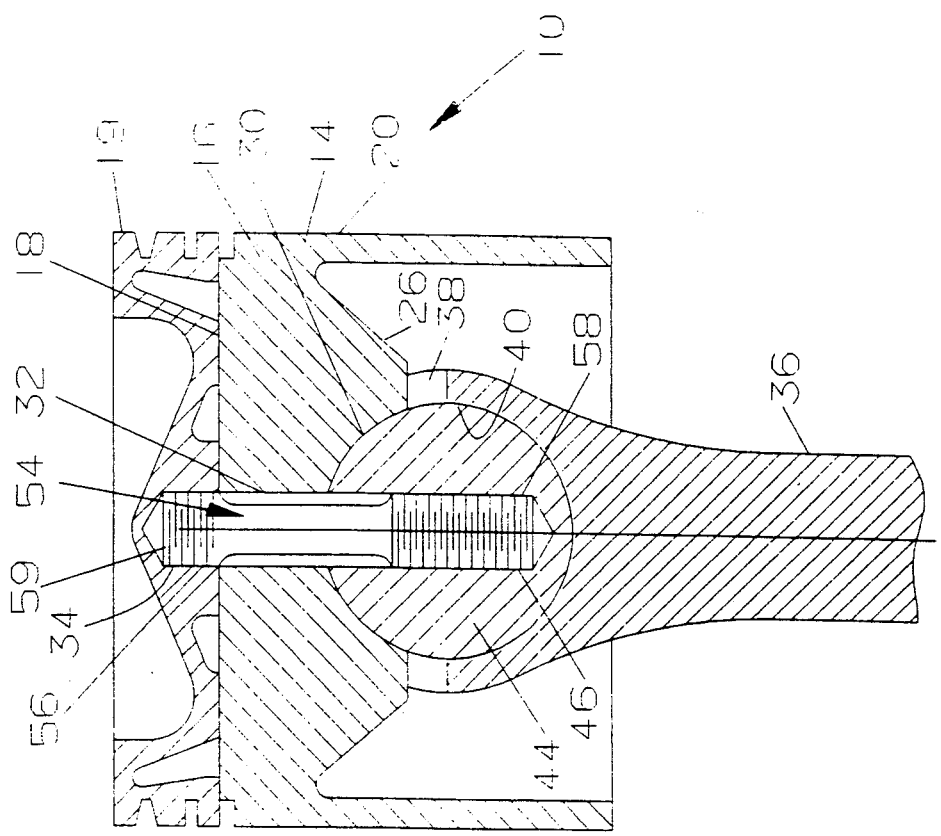

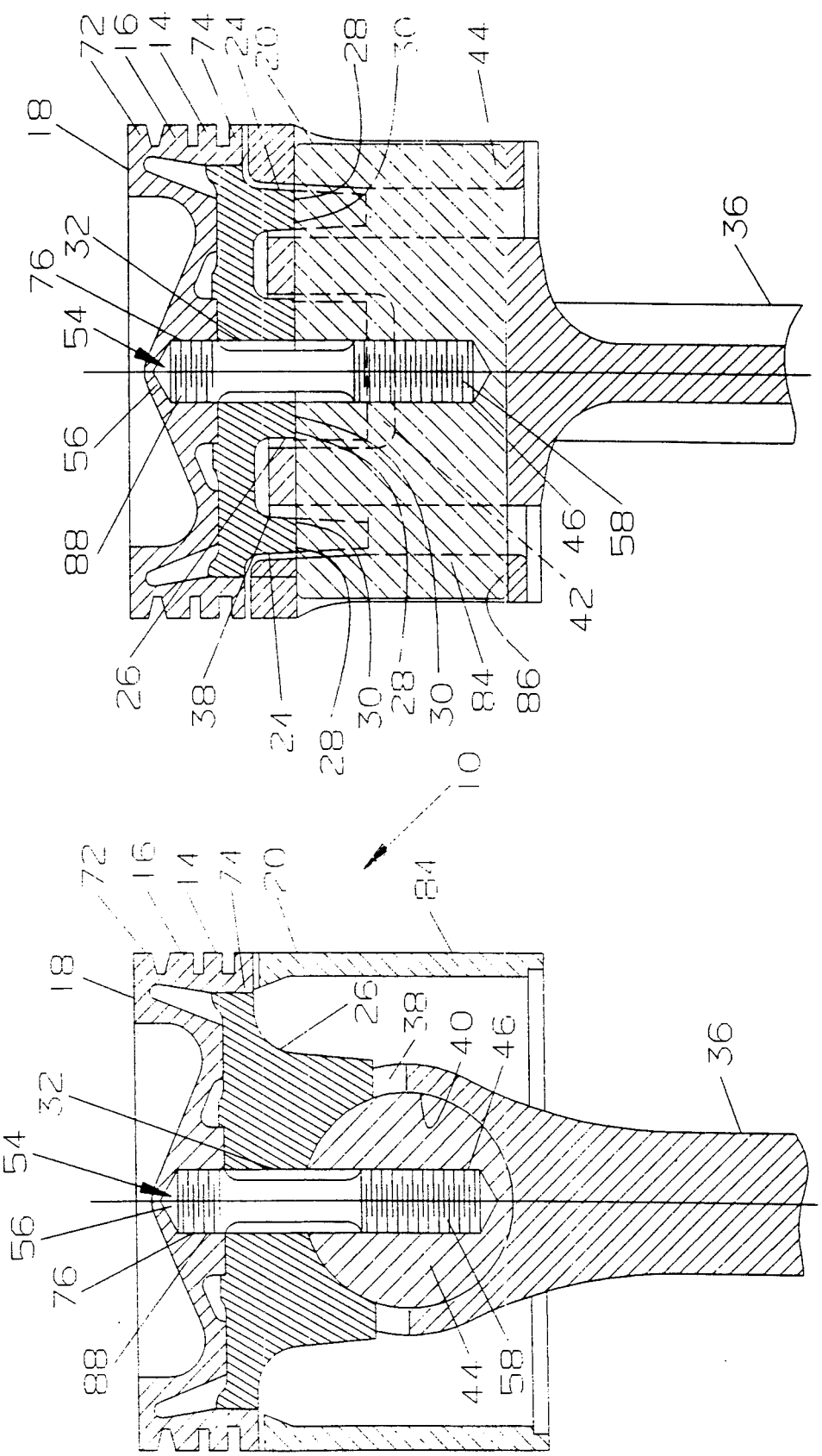

PISTON ASSEMBLY WITH DISTRIBUTED LOADING AND CENTRALLY FASTENED WRIST PIN

TECHNICAL FIELD

This invention relates generally to a piston assembly for use in an internal combustion engine and more particularly to the centralized retention of the piston to the wrist pin and distributed loading of the wrist pin.

BACKGROUND ART

Present day engines are being manufactured to produce a compact package offering improved fuel economy, longer service life, and greater power output per cylinder. The engines are constantly being upgraded in order to accomplish these goals thereby subjecting the piston assemblies to higher combustion chamber pressures and temperatures. It is for that reason that emphasis has been placed over the past several years on finding new and economical means to manufacture a piston assembly capable of withstanding these higher combustion chamber pressures and temperatures.

The goal of the prior art piston assemblies was to provide economical piston assemblies by reducing excessive weight and limiting structural components. The prior art piston assemblies included a two piece articulated piston assembly with a wrist pin attached to an upper piston member, resulting in reduced piston assembly weight, a simplified skirt or crown geometry, and improved manufacturability. However, the wrist pin is attached to the piston member by extending a bolt through the wrist pin and into the upper piston member on opposing sides of the connecting rod. Due to the high combustion pressures experienced during operation of present day engines, the bolting pattern and loading design of the prior art allows the wrist pin to flex about the central axis of the piston assembly causing ultimate failure of the design. Required bolt access on the piston underside also limits the connecting rod bearing length, and thereby, piston load capacity.

In other prior art piston assemblies, the wrist pin is attached to the connecting rod by bolts extending through the connecting rod into the wrist pin. A pair of struts or connecting members extend from an upper piston member and surround the wrist pin making a more complicated and expensive part to manufacture.

Another example of a piston assembly is disclosed in U.S. Pat. No. 1,810,423 issued to Roscoe J. Hatch on Jun. 16, 1931 wherein a one piece piston assembly has the piston member attached to the wrist pin by extending bolts through the piston member and into the wrist pin on opposing sides of the connecting rod. This prior art design may experience flexing of the wrist pin about the central axis of the piston assembly due to the bolting pattern and loading design. In addition, the one piece design results in a longer and more complicated piston assembly resulting in more costly manufacturing. Furthermore, the piston assembly disclosed by Hatch is made from aluminum with small bearings designed for the automotive industry. Therefore, the piston assembly would not withstand the pressures necessary for present day heavy duty diesel engines.

In another example, UK Pat. No. GB2,198,210A issued to Michael Ledsham Price Rhodes on Jun. 8, 1988, discloses a piston assembly. The piston having a bifurcated connecting rod and a piston member which has a central boss and two outer bosses which contact the wrist pin on three mounting surfaces. However, the one piece design results in a longer and more complicated piston assembly including a pair of struts or connecting members which surround the wrist pin resulting in increased weight for the piston assembly. The longer one piece design, including the pair of struts, is more complicated and expensive to manufacture. Furthermore, as with Hatch, the piston assembly disclosed by Rhodes is made from aluminum with small bearings designed for the automotive industry. Therefore, the piston assembly would not withstand the pressures necessary for present day heavy duty diesel engines.

The present invention discloses an attachment method which provides an inexpensive, compact design for maximum load capacity without complicated manufacturing and machining requirements. The present invention also increases the bearing area across the wrist pin increasing overall stability and reliability of the piston assembly.

DISCLOSURE OF THE INVENTION

In one aspect of the present invention a piston assembly adapted for use in an engine comprises a piston which includes a cylindrical body having a top surface, an outer cylindrical surface, and a pair of longitudinally extending outer legs positioned radially inwardly of the outer cylindrical surface. The outer legs are spaced one from the other, and a longitudinally extending central leg is disposed in a central, spaced relation to the outer legs. Both the outer legs and the central leg have a mounting end spaced from the top surface which defines a concave arcuate mounting surface. The central leg has a bore extending from the arcuate mounting surface toward the top surface. A connecting rod has a connecting end positioned between the leg members. The connecting end has a generally transverse bore therethrough and a notch opening into the bore. A wrist pin is disposed within the bore in the connecting end and in contacting relationship with the mounting surface of each of the leg members. The wrist pin has a generally transverse threaded bore therein in substantial axial alignment with the bore in the central leg. A means is provided for connecting the wrist pin to the piston and includes a member extending through the bore in the central leg and a threaded portion in engagement with the threaded bore of the wrist pin.

The disadvantage of the prior art is that they fail to provide a compact piston assembly designed for increased stability and reliability. The present invention, through the use of a centrally connected means, reduces the length of the piston assembly with an increased bearing area across the wrist pin for a less complicated design improving manufacturability and reducing costs.

BRIEF DESCRIPTION OF THE DRAWINGS

FIG. 1 is a side view of an engine embodying the present invention with portions shown is section for illustrative convenience.

FIG. 2 is an enlarged sectional view of an embodiment of the present invention shown in FIG. 1.

FIG. 3 is an enlarged sectional view taken along line 3—3 of FIG. 2.

FIGS. 4-5 and 6-7 are enlarged sectional views of alternative embodiments of the invention.

BEST MODE FOR CARRYING OUT THE INVENTION

Figure 5:
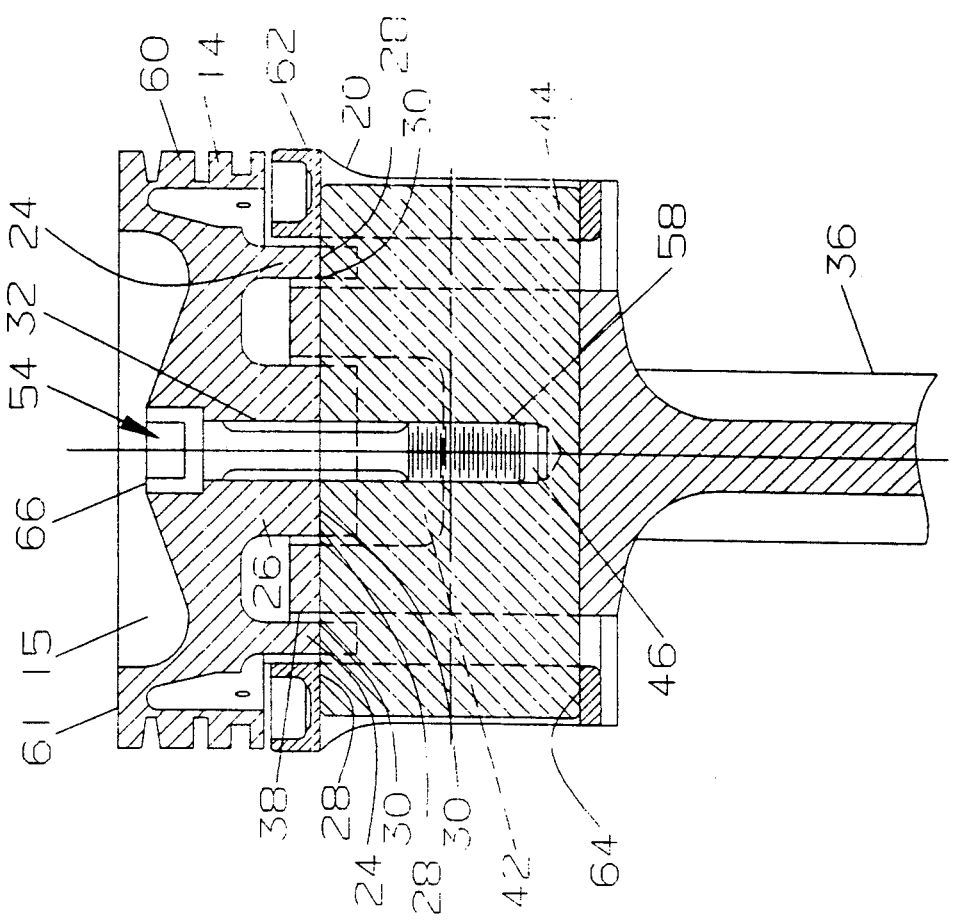

A piston assembly 10 for an internal combustion engine 12 having a piston 14 is shown in FIG. 1. A detailed view of the piston 14 is shown in FIGS. 2 and 3. The piston 14 has a combustion bowl 15, a substantially cylindrical lower body 16 with a top surface 18, and a substantially cylindrical upper body 19. The piston 14 additionally has an outer substantially cylindrical surface 20 and a pair of longitudinally extending outer legs 24 positioned radially inwardly of the outer surface 20. The outer legs 24 are spaced one from the other a predetermined distance. A longitudinally extending central leg 26 is disposed in a central, spaced relation to the outer legs 24. Both the outer legs 24 and the central leg 26 have a mounting end 28 spaced from the top surface 18. The mounting end 28 defines a concave arcuate mounting surface 30 thereon. The central leg 26 has a bore 32 extending from the arcuate mounting surface 30 and terminates at a threaded portion 34 extending into the upper body 19.

A connecting rod 36 is shown in FIG. 2 and 3 which has a bifurcated connecting end 38 positioned between the outer legs 24. The connecting end 38 has a generally transverse bore 40 therethrough and a notch 42 opening into the transverse bore 40 with the central leg 26 extending into the notch. A wrist pin 44 is disposed within the transverse bore 40 of the connecting end 38 and is in contacting relationship with the mounting surfaces 30 of the outer legs 24 and the central leg 26. The wrist pin 44 has a generally transverse threaded bore 46 therein in substantial axial alignment with the bore 32 in the central leg 26. The wrist pin 44 may be made from any suitable material such as aluminum or steel.

A means 54 for connecting the wrist pin 44 to the piston 14 is provided in the piston assembly 10. The connecting means 54 includes a threaded fastener 56, such as a stud, which extends through the bore 32 on the central leg 26. The fastener 56 includes a first threaded portion 58 threaded into the threaded bore 46 of the wrist pin 44 and a second threaded portion 59 threaded into the threaded portion 34 of the bore 32.

Other embodiments of the present invention are shown in FIGS. 4-7. It should be noted that the same reference numerals of the first embodiment are used to designate similarly constructed counterpart elements of these embodiments. It should be understood that the principles and techniques for the first embodiment described can be applied to the other embodiments shown and to any variations thereof.

Figure 4:
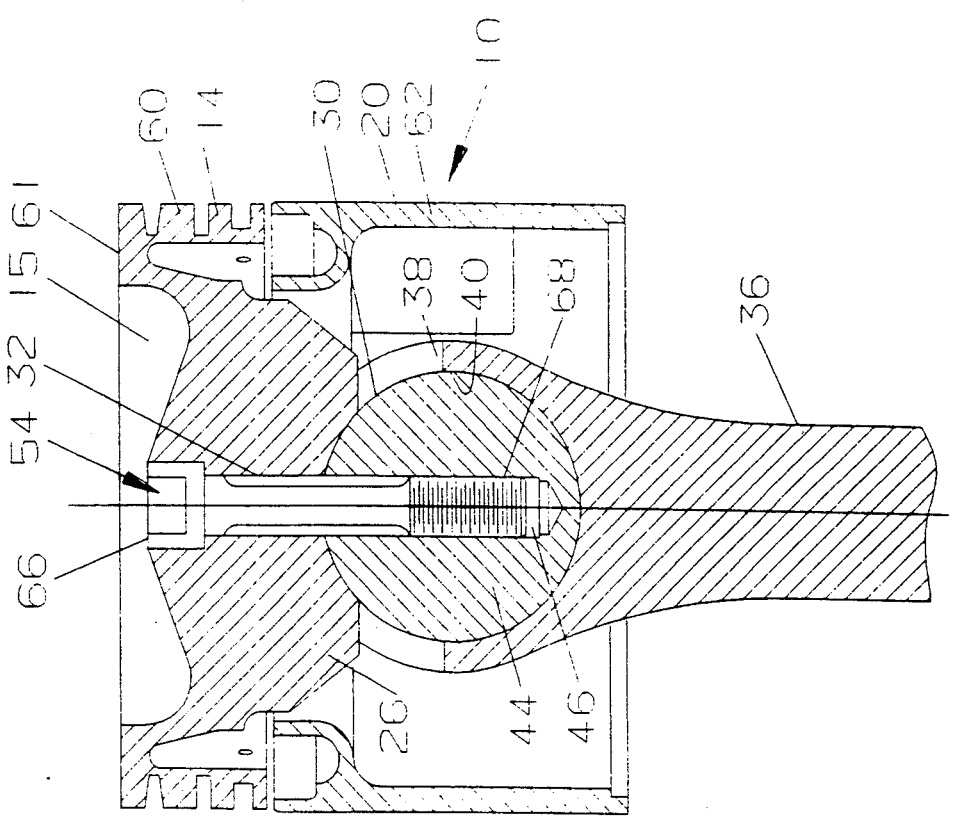

The piston shown in FIGS. 4 and 5 is an articulated piston 14 including a substantilly cylindrical body 60 having a top surface 61 and a removable skirt 62 in a spaced relationship to the upper body 60. The removable skirt 62 surrounds the outer legs 28 and has a bore 64 in substantial alignment with the transverse bore 40. The skirt 62 is made from aluminum although any suitable material may be used. The bore 32 of the central leg 26 extends from the arcuate mounting surface 30 and into the bowl 15 of the piston 14. The threaded fastener 56 is a cap screw which extends through the bore 32 on the central leg 26 so that the head of the screw is flush with the bottom of the piston bowl 15. The cap head bolt 66 has a threaded portion 68 threaded into the threaded bore 46 of the wrist pin 44.

The piston 14 shown in FIGS. 6 and 7 is an articulated piston 14 including a substantially cylindrical crown portion 72 and a separate saddle portion 74 sandwiched between the cylindrical crown portion 72 and the wrist pin 44. The saddle portion 74 is constructed from aluminum although any suitable material may be used. The outer legs 24 and the central leg 26 are an integral part of the saddle portion 74. The cylindrical crown portion 72 has a threaded bore 76 therein in substantial axial alignment with the bore 32 in the central leg 26. A removable skirt 84 has a bore 86 in substantial alignment with the transverse bore 40 of the connecting rod. The skirt 84 is in a spaced relationship with the cylindrical crown portion 72 to surround the saddle portion 74. The threaded fastener 56 is a stud and includes the threaded portion 59 threaded into the threaded bore 76 in the cylindrical crown portion 72.

INDUSTRIAL APPLICABILITY

In use, the piston assembly 10 is subjected to high combustion pressures which are transferred through the piston 14 and onto the wrist pin 44. The mounting surfaces 28, 30 of the two outer legs 24 and the central leg 26 are positioned to contact the wrist pin 44 in three locations so that the force is substantially distributed across the length of the wrist pin 44. Also, the connecting means 54, while maintaining proper connection between the upper and the lower cylindrical bodies 19, 16, the wrist pin 44, and the connecting rod 36 through all the combustion and inertia forces encountered in engine operation, permits the bore area 40 to be proportionately larger than more conventional designs having struts. Thus, the distributed forces across the length of the wrist pin 44 decrease the tendency for the wrist pin 44 to flex during operation. Due to the substantially uniform forces across the length of the wrist pin 44 and the resultant decrease in flex, the wrist pin 44 can be manufactured from a material with lesser structural constraints, such as aluminum. The aluminum wrist pin 44 does not require the use of a bushing due to the nature of the material. Lubrication, however, can be provided to the aluminum wrist pin 44 in any suitable manner so that the life of the wrist pin 44 is maintained.

The piston assembly 10 shown in FIGS. 2 and 3 is assembled by first placing the lower body 14 in proper alignment with the connecting rod 36 and inserting the wrist pin 44 into the aligned lower body 16 and transverse bore 40 of the connecting rod 36. The threaded stud 56 simultaneously connects the wrist pin 44 to the upper body 19, lower body 16, and connecting rod 36. This is accomplished by threading the threaded stud 56 into the threaded portion 34 of the bore 32 within the upper body 19. The threaded stud 56 is then inserted through the bore 32 in the lower body 16 and threaded into the threaded bore 46 of the wrist pin 44 until the upper body 19 abuts the lower body 16. The threaded stud 56 allows the piston assembly 10 to be manufactured without conventional struts for a more compact piston design.

The piston assembly 10 shown in FIGS. 4 and 5 is assembled by first placing the skirt 62 in proper alignment with the connecting rod 36 and inserting the wrist pin 44 into the aligned bore 64 of the skirt 62 and the transverse bore 40 of the connecting rod 36. The cap screw 56 simultaneously connects the wrist pin 44 to the body 60 and the connecting rod 36. This is accomplished by inserting the screw 56 through the bore 32 in the central leg 26 and threading the bolt 56 into the threaded bore 46 of the wrist pin 44. The screw 56 is tightened so that the head of the screw 56 is flush with the bottom of the bowl 15 and the piston assembly 10 is securely fastened together. The screw 56 allows the piston assembly 10 to be manufactured without conventional struts for a more compact piston design.

The piston assembly 10 shown in FIGS. 6 and 7 is assembled by first placing the skirt 84 in proper alignment with the connecting rod 36 and inserting the wrist pin 44 into the aligned bore 84 of the skirt 84 and the transverse bore 40 of the connecting rod. The threaded stud 56 simultaneously connects the wrist pin 44 to the crown portion 72, the saddle portion 74, and the connecting rod 36. This is accomplished by threading the threaded stud 56 into the threaded bore 76 within the upper crown 72. The threaded stud 56 is then inserted through the bore 32 in the lower body 16 and threaded into the threaded bore 46 of the wrist pin 44 until the upper crown 72, the saddle portion 74, and the lower body 16 are in abutment. The threaded stud 56 allows the piston assembly 10 to be manufactured without conventional struts for a more compact piston design.

In view of the above, it is apparent that the present invention provides an improved means to distribute forces across the length of the wrist pin while providing a connecting means which reduces the manufacturing costs of the piston assembly. The present invention utilizes a piston design having three contact locations on the wrist pin so that the force is substantially distributed across the length of the wrist pin. Additionally, the present invention includes a connecting means which simultaneously connects the piston assembly in a manner which does not require conventional struts allowing for a larger connecting bore area and a shorter piston with maximum load capacity.

We claim:

1. A piston assembly adapted for use in an engine, comprising:

a piston including a combustion bowl, a substantially cylindrical body having a top surface, an outer substantially cylindrical surface, a pair of longitudinally extending outer legs positioned radially inwardly of the outer surface and being spaced one from the other, and a longitudinally extending central leg disposed in a central, spaced relation to the outer legs, the outer legs and the central leg each having a mounting end spaced from the top surface and defining a concave arcuate mounting surface thereon, the central leg having a bore extending from the arcuate mounting surface toward the top surface;

a connecting rod having a connecting end positioned between the outer legs, the connecting end having a generally transverse bore therethrough and a notch opening into the transverse bore with the central leg extending into the notch;

a wrist pin disposed within the transverse bore and in contacting relationship with the mounting surface of each of the legs, the wrist pin having a generally transverse threaded bore therein in substantial axial alignment with the bore in the central leg; and means for connecting the wrist pin to the piston, the connecting means including a threaded fastener extending through the bore in the central leg and including a threaded portion threaded into the threaded bore of the wrist pin.

2. The piston assembly of claim 1, wherein the wrist pin is aluminum.

3. The piston assembly of claim 1, wherein the piston includes a substantially cylindrical upper body and the threaded fastener is a stud having another threaded portion threaded into the threaded portion of the bore in the upper body.

4. The piston assembly of claim 3, wherein the wrist pin is aluminum.

5. The piston assembly of claim 1, wherein the piston includes a removable skirt in a spaced relationship with the body and surrounding the outer legs.

6. The piston assembly of claim 5, wherein the bore in the central leg extends to the bowl of the piston and the threaded fastener is a screw, the head of the screw being flush with the bottom of the bowl.

7. The piston assembly of claim 6, wherein the wrist pin and the removable skirt are aluminum.

8. The piston assembly of claim 1, wherein the body of the piston includes a substantially cylindrical crown portion and a saddle portion sandwiched between the crown portion and the wrist pin with the outer legs and the central leg being an integral part of the saddle portion, the crown portion having a threaded bore therein in substantial axial alignment with the bore in the central leg.

9. The piston assembly of claim 8, wherein the piston includes a removable skirt in a spaced relationship with the crown portion and surrounding the saddle portion.

10. The piston assembly of claim 9, wherein the threaded fastener includes another threaded portion threaded into the threaded bore in the crown portion.

11. The piston assembly of claim 10, wherein the saddle portion, the removable skirt, and the wrist pin are aluminum.

* * * * *